United States Patent [19]

Cunningham

[11] 4,006,552
[45] Feb. 8, 1977

[54] FISHING LURE

[76] Inventor: Patrick J. Cunningham, 12250 Wayburn Ave., Detroit, Mich. 48224

[22] Filed: Oct. 17, 1975

[21] Appl. No.: 623,481

[52] U.S. Cl. .............................. 43/42.48; 43/42.49
[51] Int. Cl.[2] ...................................... A01K 85/00
[58] Field of Search ............ 43/42.49, 42.48, 42.44

[56] References Cited

UNITED STATES PATENTS

| | | | |
|---|---|---|---|
| 1,745,006 | 1/1930 | Chapleau | 43/42.48 |
| 2,314,907 | 3/1943 | Sweeney | 43/42.48 |
| 2,516,468 | 7/1950 | Klein | 43/42.48 X |
| 2,621,438 | 12/1952 | Helin | 43/42.44 |
| 2,756,535 | 7/1956 | Dean | 43/42.48 |

*Primary Examiner*—G.E. McNeill
*Assistant Examiner*—Daniel J. Leach
*Attorney, Agent, or Firm*—Cullen, Settle, Sloman & Cantor

[57] ABSTRACT

A fishing lure or plug which includes an elongated L-shaped body made of a buoyant material such as high-strength honeycomb plastic. The tail portion includes hooks loosely suspended therefrom and the head portion has a generally tapered plano-convex cross-sectional form with a generally flat top surface. The top surface is provided with a longitudinal slot having a pin extending laterally through the slot with its ends anchored within the walls thereof. A link member having an eyelet on one end is pivotally mounted loosely on the pin and has its opposite end adapted for attachment to a fishing line. The lateral width of the slot is dimensioned for permitting the eyelet to freely slide laterally back and forth on the pin between the walls of the slot to impart a fluttering or snake-like motion to the tail portion for attracting fish to strike the lure.

5 Claims, 7 Drawing Figures

FISHING LURE

BACKGROUND OF THE INVENTION

1. Field of the Invention

This invention relates generally to an improved fishing lure having a body from which hooks are suspended loosely so as to have limited swinging movement relative to the body and, more particularly, to an improved fishing lure having a link assembly for connecting the fishing line to the lure for imparting a fluttering or snakelike motion to the lure.

2. Description of the Prior Art

The prior art teaches many different sizes and shapes of fishing lures or plugs having one or more hook assemblies loosely suspended therefrom. Prior art patents teach many ways of attaching or suspending the hook; many different types of hook assemblies; and several different means for connecting the lure to the fishing line. Furthermore, the prior art teaches both floatable and submersible lures and various means for controlling the depth at which a lure travels. Additionally, many lures are shaped or equipped with additional fins, veins or members extending away from the body to impart some type of motion to the lure in order to entice the fish to strike the lure. Some of the prior art patents teach a link assembly whereby the link member is rigidly fixed to the lure while others teach a link assembly wherein the link is free to pivot about a swivel or about the longitudinal axis of the body, but this is generally done to improve maneuverability and to compensate for changes in the running depth of the lure.

Typical examples of the fishing lures of the prior art include U.S. Pat. Nos. 2,516,468; 3,583,089; 2,817,181; 2,305,865; 2,621,438; 1,711,200; 1,898,740; and 2,760,294. While these patents typify the varying shapes of lures found in the prior art and teach various means for attaching the hook assemblies and the fishing line to the body of the lure, none teach the present pinslot arrangement for capturing a link whose opposite end is attached to the fishing line such that the link moves laterally back and forth on the pin within the slot to impart a fluttering or snake-like movement to the lure as it is pulled through the water by the fishing line.

SUMMARY OF THE INVENTION

The present invention relates to a fishing lure or plug and a novel means for imparting an erratic fluttering or snake-like motion to the lure to attract the attention of the fish and entice him to strike the lure. This is accomplished in a relatively simple manner without the use of external fins, veins or other members extending from the body of the lure.

The fishing lure of the present invention includes an enlongated body having a head portion and an elongated tail portion adapted to loosely suspend hooks therefrom. The juncture of the head and tail portions is the widest portion of the body and both the head portion and the tail portion taper away from the juncture toward the free ends thereof. The tail portion has a generally convexo-convex cross-sectional form throughout the longitudinal extent and the head portion has substantially a plano-convex cross-sectional form throughout its longitudinal extent. The head portion has a substantially flat top portion and a generally arcuate free end. An elongated longitudinal slot is provided in the flat top surface of the head portion and a mounting pin extending laterally through the slot has its end rigidly anchored in the walls of the slot. An elongated link having a substantially closed loop or eyelet at one end thereof is pivotally mounted on the pin and the opposite end of the link is adapted for attachment to the fishing line. The lateral width of the slot is dimensioned so that the loop or eyelet on the end of the link has a lateral width which is less than the lateral width of the slot so that the link is freely moveable laterally on the pin between the walls of the slot so as to impart an erratic fluttering or snake-like motion to the tail portion of the lure thereby attracting the attention of the fish and enticing it to strike the lure.

The lure may be made of a generally buoyant material such as high strength honeycomb plastic or the like so that it is relatively strong and durable. The fluttering motion is achieved without the use of external members which may severely increase the resistance of the lure in the water and which may break off or become snagged on debris in the water thereby causing damage to, or the loss of, the lure. The fluttering movement of the present invention is achieved in an easy to make, relatively fail-safe, maintenance-free, low cost lure; and the fluttering or snake-like motion has been found to be particularly effective in attracting or enticing fish to strike the lure.

BRIEF DESCRIPTION OF THE DRAWINGS

These and other objects and advantages of the present invention will become more readily apparent upon reading the following specification which describes an illustrative embodiment of the invention, along with the accompanying claims and the drawing in which:

DESCRIPTION OF THE PRIME EMBODIMENT

Figure 1:
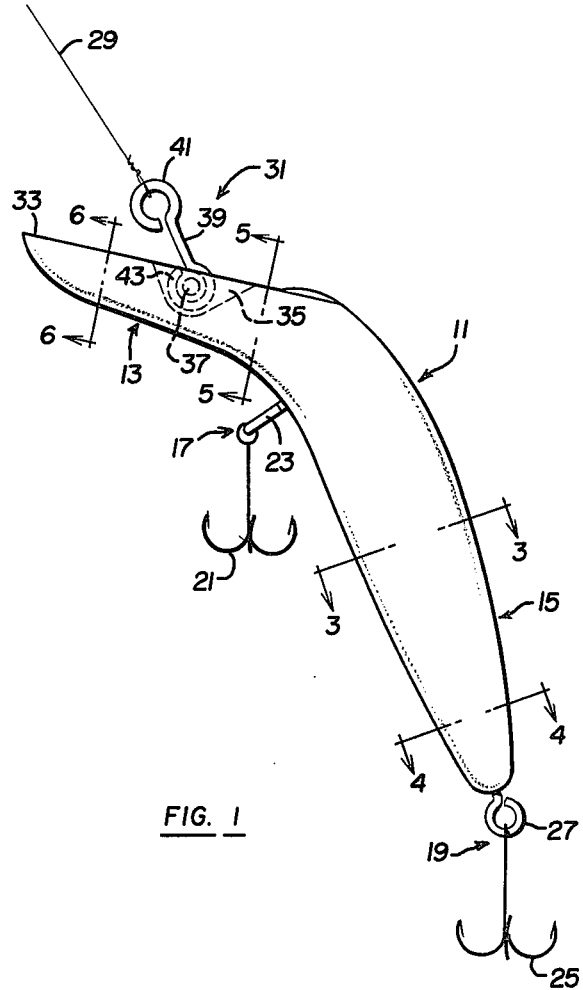
FIG. 1 is a side view, partially in section, of the prime embodiment of the fishing lure of the present invention.
Figure 6:
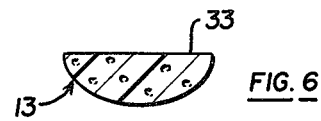
FIG. 6 is a sectional view taken along the view lines 6—6 of FIG. 1 and shows the plano-convex cross-sectional form of the front end of the head portion of the lure of FIG. 1.
Figure 5:
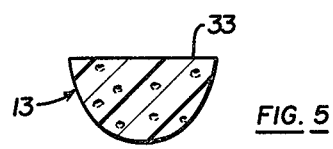
FIG. 5 is a sectional view taken along the view lines 5—5 of FIG. 1 and shows the plano-convex cross-sectional form of the head portion of the lure of FIG. 1.

FIG. 1 illustrates a side view of the prime embodiment of the fishing lure or plug of the present invention. The lure includes an elongated, generally L-shaped unitary body 11 having an elongated head or front portion 13 and an elongated tail or rear portion 15. In the prime embodiment, the tail portion 15 is shown as being longer than the head portion 13 and is equipped with two hook assemblies 17 and 19. The major hook assembly 17 includes a hook 21 which may be, for example, a treble hook or, alternatively, a single hook or any other type of hook known in the prior art.

Figure 3:
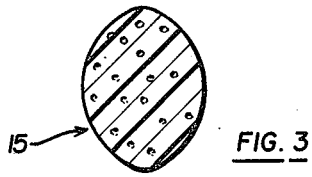
FIG. 3 is a sectional view taken along the view lines 3—3 of FIG. 1 and shows the convexo-convex cross-sectional form of the tail portion of the lure of FIG. 1.
Figure 4:
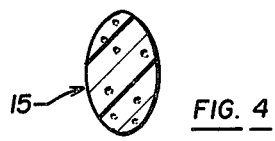
FIG. 4 is a sectional view taken along the view lines 4—4 of FIG. 1 and shows the convexo-convex cross-sectional form nearer the end of the tail portion of the lure of FIG. 1.

The hook 21 is secured to the bottom of the forward end of the tail portion 15 at the juncture of the tail portion 15 with the head portion 13 by means of a screw eye 23 or some similar fastening means known in the art. The trailing hook assembly 19 includes a hook 25 which may be similar to the hook 21 or to any other type of hook known in the prior art and is connected to the tapered distal end of the elongated tail portion 15 by means of screw eye 27 or some similar fastening means, as known in the art. The juncture of the tail portion 15 with the head portion 13 is the thickest portion of the body 11 of the lure and the tail portion 15 tapers generally away from the juncture toward its distal end. As illustrated in FIGS. 3 and 4, the cross-sectional form of the tail portion 15 is generally convexo-convex with a continuing taper toward the distal end.

Figure 2:
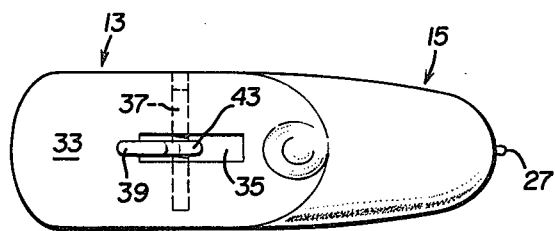
FIG. 2 is a top view of the fishing lure of FIG. 1.

The head portion 13 of the lure is connected to a fishing line 29 by a link assembly 31. The head portion 13 has a generally tapered plano-convex cross-sectional form with the taper being toward the front end thereof. The generally planar or flat top surface 33 is provided with an elongated slot 35, as seen in FIGS. 1 and 2, which has parallel sides and ends which taper toward one another and intersect. A mounting pin 37 extends laterally across the slot 35 and has its ends rigidly anchored in the walls of the slot 35. The link assembly 31 includes an elongated link member 39 having a substantially closed loop portion or eyelet 41 at the outwardly projecting end for attaching the fishing line 29 thereto. The opposite ends of the link member 31 includes a second pin-engaging eyelet or loop 43 which is pivotally mounted loosely upon the pin 37 so as to allow the link member 39 to pivot longitudinally on the pin 37.

Figure 7:
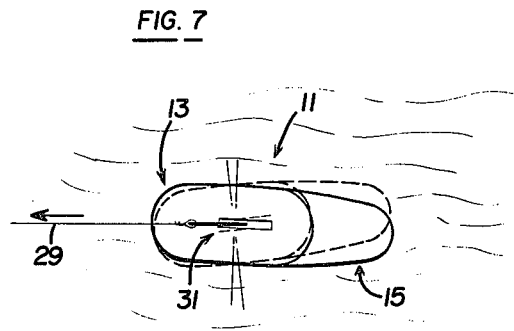
FIG. 7 is an illustrative top view of the lure of the present invention to illustrate the fluttering motion of the tail portion while the lure is moving through the water.

As seen in FIG. 2, the slot 35 is dimensioned or sized as to its lateral width with respect to the lateral width of the eyelet 43 so as to allow the eyelet 43 to slide laterally back and forth on the pin 37 between the walls of the elongated slot 35 such that when the lure is pulled by the fishing line 29, the lateral movement of the eyelet 43 on the pin 37 will impart an erratic fluttering or snake-like motion to the tail portion 15 of the lure. This fluttering or snake-like motion, as illustrated by the solid and dashed lines of FIG. 7, has been found to be particularly effective in attracting the attention of fish and enticing them to strike the lure.

In the prime embodiment of the present invention, the body 11 of the lure is made from a buoyant material such as relatively high-strength honeycombed plastic or the like. The slot 35 may be molded when the unitary body 11 is made and the pin 37 can be inserted through one of the side walls of the head portion 13 so as to pivotally engage the eye 43 of the link assembly 31 and extend across the lateral width of the slot 35 to become anchored in the opposite wall. This construction insures that the lure cannot be easily broken and the means of attachment is relatively fail-safe and error-free while imparting the highly desireable fluttering motion to the lure.

While specific apparatus and materials have been recited in describing the prime embodiment of the present invention, it will be obvious to those skilled in the art that various modifications can be made without departing from the spirit and scope of the present invention which is limited only by the appended claims.

I claim:

1. A fishing lure comprising a unitary elongated body adapted to loosely suspend hooks therefrom, said body being generally L-shaped and including an elongated head portion and an elongated tail portion, the juncture of said head and tail portions being the widest with the head portion and the tail portion each being provided with a taper near the free end thereof, said head portion having a generally flat upper surface and a plano-convex cross-sectional form throughout its longitudinal extend and a generally arcuate tapered free end, said tail portion having an arcuate convexo-convex cross-sectional form throughout its longitudinal extent, said head portion including an elongated longitudinal slot in said flat upper surface, said slot defining major side wall portions which are generally perpendicular to said flat upper surface and generally parallel to a longitudinal axis through the head portion, a mounting pin extending laterally through said slot and having the ends of the pin rigidly anchored in the major side walls of said slot, said mounting pin being essentially perpendicular to the longitudinal axis of the head portion, an elongated link having a substantially closed loop at one end thereof, said loop being disposed in said slot and being loosely mounted around said pin, said loop having a lateral width less than the lateral width of said slot and being freely movable laterally on said pin along the lateral axis thereof in a direction essentially perpendicular to the longitudinal axis of the head portion, the degree of lateral movement being limited by the major side walls of said slot, the body of said link extending outwardly from said slot and being pivotable about said pin, the other end of said link including means adapted to be attached to a fishing line for permitting a lateral fluttering motion of the tail section when the body is pulled through the water by said fishing line.

2. The fishing lure of claim 1 wherein said body is made from a buoyant material.

3. The fishing lure of claim 2 wherein said buoyant material is a high strength plastic honeycomb material.

4. The fishing lure of claim 1 wherein said tail portion is longer than said head portion, wherein said link has an eyelet on the other end thereof for attaching a fishing line thereto and wherein said hooks loosely suspended from said body includes a trailing hook connected for swinging movement to the distal end of said tail portion.

5. The fishing lure of claim 1 wherein said hooks loosely suspended from said body include a trailing hook swingably connected to the tapered end of said tail portion of a major hook swingably connected on the bottom of said body at the juncture of said head and tail portions.

* * * * *